United States Patent [19]

Saito et al.

[11] Patent Number: 4,907,147
[45] Date of Patent: Mar. 6, 1990

[54] PIPELINED DATA PROCESSING SYSTEM WITH REGISTER INDIRECT ADDRESSING

[75] Inventors: Yuuichi Saito; Toyohiko Yoshida, both of Itami, Japan

[73] Assignee: Mitsubishi Denki Kabushiki Kaisha, Japan

[21] Appl. No.: 156,271

[22] Filed: Feb. 12, 1988

[30] Foreign Application Priority Data

Jun. 9, 1987 [JP] Japan .................................. 62-144394

[51] Int. Cl.[4] .......................... G06F 7/38; G06F 15/00
[52] U.S. Cl. ................................. 364/200; 364/231.8; 364/238.7
[58] Field of Search ... 364/200 MS File, 900 MS File

[56] References Cited

U.S. PATENT DOCUMENTS

| | | | |
|---|---|---|---|
| 3,771,138 | 11/1973 | Celtruda | 364/200 |
| 3,787,673 | 1/1974 | Watson | 364/200 |
| 3,875,391 | 4/1975 | Shapiro | 364/200 |
| 4,025,771 | 5/1977 | Lynch | 364/200 |
| 4,075,688 | 2/1978 | Lynch | 364/200 |
| 4,112,489 | 9/1978 | Wood | 364/200 |
| 4,187,539 | 2/1980 | Eaton | 364/200 |

Primary Examiner—David Y. Eng
Attorney, Agent, or Firm—Townsend & Townsend

[57] ABSTRACT

A system for preventing register conflict in a pipeline including a flag group memories at selected stages for storing flag groups indicating which general purpose registers are reserved by the instructions being processed at the selected stages. A flag group associated with a particular instruction is shifted with the instruction through the pipeline.

1 Claim, 6 Drawing Sheets

|  | T1 | T2 | T3 | T4 | T5 | T6 | T7 | T8 |
|---|---|---|---|---|---|---|---|---|
| D STAGE | I1 | I2 | I2 | I2 | I2 |  |  |  |
| A STAGE |  | I1 |  |  |  | I2 |  |  |
| F STAGE |  |  | I1 |  |  |  | I2 |  |
| E STAGE |  |  |  | I1 |  |  |  | I2 |

Fig. 2B
Prior Art

|  | T1 | T2 | T3 | T4 | T5 | T6 | T7 | T8 |
|---|---|---|---|---|---|---|---|---|
| D STAGE | I1 | I2 | I3 | I3 | I3 |  |  |  |
| A STAGE |  | I1 | I2 | I2 | I2 | I3 |  |  |
| F STAGE |  |  | I1 |  |  | I2 | I3 |  |
| E STAGE |  |  |  | I1 |  |  | I2 |  |

PIPELINED DATA PROCESSING SYSTEM WITH REGISTER INDIRECT ADDRESSING

BACKGROUND OF THE INVENTION

1. Field of the Invention

The present invention relates generally to a processor including an instruction pipeline and more particular to a system for preventing register conflicts during the pipeline processing of a series of instructions.

2. Description of the Prior Art

Generally, an instruction pipeline includes a number of processing stages connected in series. One common arrangement includes a decode stage, an address computation stage, operand fetch stage, and an execution stage. Many processors included one or more general purpose registers which may store data that is read during processing of an instruction at one stage of the pipeline or receive data that is written during processing at another stage in the pipeline. In some cases, the processing at a given stage may require data from a general purpose register that was written during processing at a preceding stage. As described more fully below, the processing at the preceding stage may not yet be completed when processing at the given stage requires the data. Thus, a register conflict exists where the given stage needs data that has not yet been written.

For example, if a given instruction in a series of instructions specifies indirect addressing, then the address of the data to be read is stored in the general purpose register. In some cases, this address is computed by a preceding instruction in the series of instructions. In this case, a register conflict may occur when the given instruction is being processed at the address computation stage if the previous instruction has not yet calculated the address and written it to the general purpose register.

Figure 1:
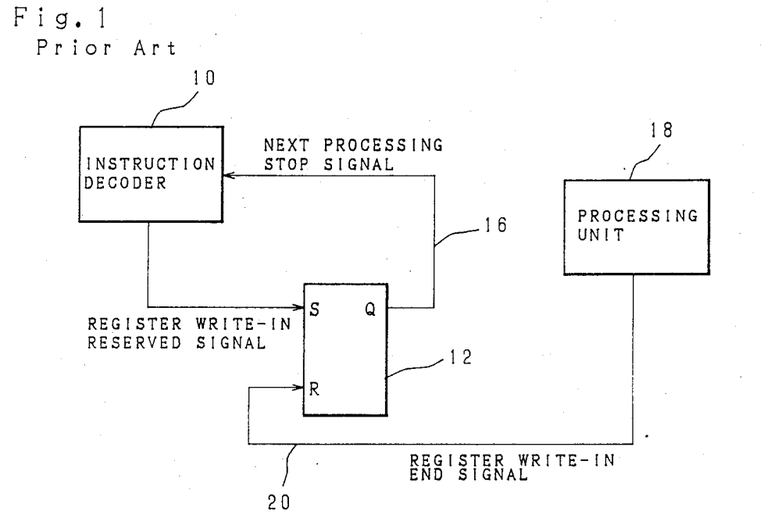
FIG. 1 is a schematic diagram of a conventional circuit for preventing register conflict.

FIG. 1 is a schematic diagram of a conventional pipeline control circuit for preventing register conflict. In FIG. 1, an instruction decoder 10 has an output connected to the S input of a register conflict flip-flop 12 by a first signal line 14 and an input connected to the output of the flip-flop 12 by a second signal line 16. A processing unit 18 has an output coupled to the reset input of flip-flop 12 by a third signal line 20.

The operation of this circuit will now be described. The decoder sets the state of a register write-in reserved signal (RWRS) for each instruction decoded to indicate whether the instruction is to write data to the general purpose register when executed. This signal is transmitted on the first signal line 14 to the input of the flip-flop 12. The state of the output of the flip-flop 12 is determined by the state of the RWRS and functions as a register write-in status flag (RWSF) which is supplied to the decoder 10 by the second signal line 16.

If a given instruction sets the RWSF, then the processor 18 generates a register write-in end signal when the given instruction has completed writing data to the general purpose register. This signal resets the RWSF. The effect of setting the RWSF on the processing of subsequent instructions in the pipeline will be described for two cases with reference to FIGS. 2A and 2B.

Figure 2A:
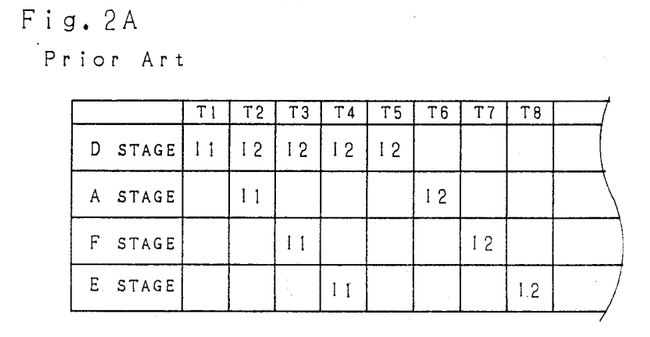
FIGS. 2A and 2B are charts illustrating timing delays due to register conflict.

FIG. 2A is a chart illustrating the timing of pipeline processing for instructions I1 and I2. The stages in the pipeline are represented vertically and the number of machine cycles required to complete processing are represented horizontally. In FIG. 2, I1 sets the RWSF and is processed through the pipeline in four cycles. The RWSF is reset at T4. In this first case, I2 is also to set RWSF, but since the RWSF has already been set by I1 it must wait until the RWSF has been reset at T4. At T5 the instruction I2 sets the RSWF and proceeds through the pipeline to finish execution at T8. If no conflict had existed, I2 would have finished processing at T5. Accordingly, for this first type of register conflict processing a delay of three machine cycles is introduced into the pipeline for every conflict.

Figure 2B:
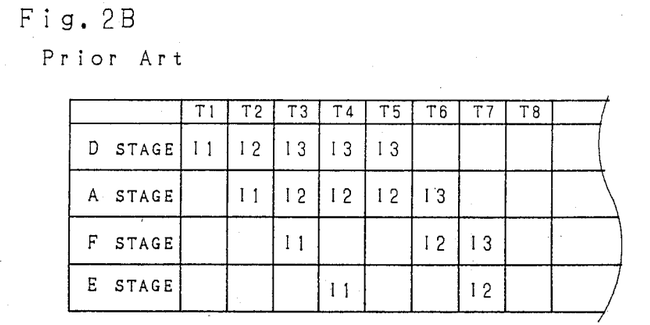

FIG. 2B is a chart, similar to FIG. 2A, illustrating a second type of register conflict. As in FIG. 2A, I1 sets the RWSF at T1 and resets it at T4. In this case I2 is does not set the RWSF and, after decoding at T2, advances to the address computation stage at T3. At this stage it is determined that I2 calls for register indirect addressing and must read data from the general purpose register. Thus, processing must be stopped until I1 finishes writing to the general purpose register and resets the RWSF at T4. At T5 the processing of I2 restarts and is completed at T7. In this second type of register conflict processing, a delay of two machine cycles is introduced into the pipelining for every conflict.

These delays caused by register conflict processing result in a substantial decrease in the rate of throughput of the pipeline. Further, the effect is increased in advanced, high-performance processors having a large number of pipeline stages and increased utilization of general purpose registers.

Accordingly, improvements in register conflict processing are greatly needed in the processor arts.

SUMMARY OF THE INVENTION

The present invention is a system for reducing delays introduced into a pipeline processing system due to register conflict. In a preferred embodiment of the invention, a flag is set during the decode stage indicating whether a first instruction has reserved a general purpose register for write-in at a preceding stage in the pipeline. The first instruction and its flag are shifted as a pair through the pipeline. Thus, following instructions are able to set their flags without waiting for the processing of the first instruction to be completed.

According to one aspect of the invention, a given stage, e.g., the address computation stage, that requires data from a general purpose register includes a system for determining whether the general purpose register has been reserved by a preceding instruction.

According to a further, particularly important embodiment including N general purpose registers, a flag is set indicating which of the general purpose registers are to be reserved. The system at the given stage determines which general purpose registers need to be read. If the general purpose registers needed are not reserved than processing at the given stage continues.

In one embodiment, a shift register is utilized to shift a flag from stage to stage. The stages of the shift register at the operand fetch and execution stages are provided with special reset circuitry to provide for instances where processing at a following stage is stopped due to register conflict.

Additional features and advantages of the invention will become apparent in view of the drawings and following detailed description.

DETAILED DESCRIPTION OF THE PREFERRED EMBODIMENTS

Figure 3:
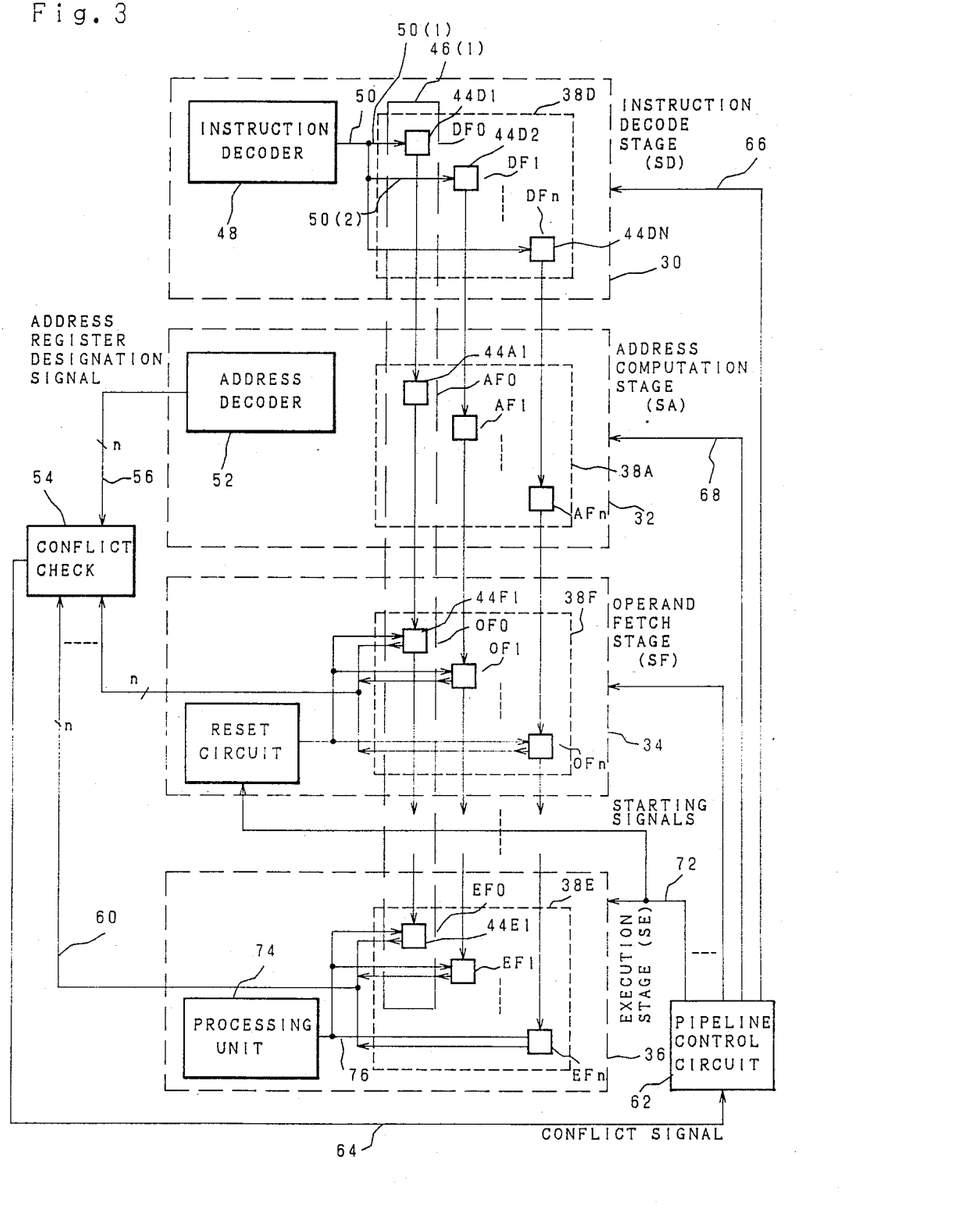
FIG. 3 is a block diagram of an embodiment of the invention.

FIG. 3 is a block diagram of a preferred embodiment of the invention. In FIG. 3, a register conflict processing circuit for a processor having N general purpose registers (not shown) is depicted. Referring now to FIG. 3, an instruction pipeline includes a decode stage 30, address computation stage 32, operand fetch stage 34, and execution stage 36.

The decode stage 30 includes an SD flag memory group 38D comprising N flip-flops 44D1 through 44DN. Similarly, the address computation stage 32, operand fetch stage 34, and execution stage 36 include SA, SF, and SE flag memory groups 38A, 38F, 38E respectively. The flip-flops 44 in each flag memory group 38 corresponding to a particular general purpose register are interconnected to form a RWSF pipeline shift register 46. For example, the first flip-flop 44D1, 44A1, 44F1, and 44E1 in each flag storage group 38 corresponds to the first general purpose register. These flip-flops 44(1) are interconnected to form the first RWSF pipeline register 46(1). The detailed structure of these shift registers is described below with reference to FIGS. 4 and 5.

An instruction decoder 48 has an output port coupled to the flip-flops 44 in the SD flag memory group 38D by a first bus 50. An address decoder 52 has an output port coupled to a first input port of a conflict check unit 54 by a second bus 56. A second input port of the conflict check unit 54 is coupled to the outputs of the flip-flops 44 in the SF flag memory group 38F by a third bus 58 and a third input port is coupled to the outputs of the flip-flops 44 of the SE flag memory group 38E by a fourth bus 60. The output of the conflict check unit 54 is coupled to the input of a pipeline control circuit 62 by a register conflict signal line 64. The output port of the pipeline control circuit 62 is is coupled to the stages of the pipeline by SD,SA,SF, and SD control lines 66. 68. 70, and 72 respectively. The actual interconnections between the flip-flops 44 and the pipeline control circuit 62 are shown in detail in FIG. 4.

The output port of a processing unit 74 is connected to the reset ports of the flip-flops 44 in the SE flag memory group by a register write-in signal bus 76. An input port of a reset circuit 78 is also coupled to SE control line 74. The output port of the reset circuit 78 is coupled to the reset ports of the flip-flops 44 in the SF flag memory group by a reset bus 80.

Each of the above-described buses includes N conductive lines couple to respective ones of the flip-flops 44 or other circuits associated with each of the N general purpose registers.

A general overview of the operation of the system depicted in FIG. 3 for the two types of register conflicts described above will now be provided. This embodiment provides two dimensions of improvement over the prior art. The first dimension, denoted the vertical dimension, refers to the RWSF shift register groups 46 and is effective in eliminating delays due to register conflicts of the first type where two consecutive instructions are to write data to the same general purpose register. Without loss of generality, this feature will be described with reference to only the first RWSF shift register 46(1).

At T1, the instruction I1 sets the RWSF in flip-flop 44D1. As the instruction I1 is shifted through the stages of the pipeline the RWSF is shifted in synchronism to the following flip-flops 44 in the first RWSF shift register 46(1). For example, at T2, as instruction I1 is shifted to the address computation stage 32, its RWSF is shifted to the flip-flop 44A1 in the SA flag memory group 38A, and the flip-flop 44D1 is reset. Thus, at T2 instruction I2 may set its RWSF in flip-flop 44D1 and no delay is introduced into the pipeline.

The steps for processing a register conflict of the second type will now be described with reference to only this first RWSF shift register 46(1). In this case. I1 sets the RWSF in flip-flop 44D1 at T1 and the instruction I1 and its RWSF advance through the pipeline. At T3 I1 and its RWSF are at the operand fetch stage 34 and I2 is at the address computation stage 32. The instruction I2 calls for register indirect addressing so an address register designation signal, designating the first general purpose register in this case, is generated by the address decoder 52 and transferred to the conflict check unit 54. The conflict check unit 54 also receives the RWSF of I2 from the flip-flop 44F1 on the bus 58. Since I2 requires data that has not yet been written a conflict signal is generated at the conflict check unit 54 and transferred to the pipeline control circuit 62 on the register conflict signal line 64. The pipeline control circuit 62 controls the state of the signal on the SA control line 68 to halt the processing of I2 at the address computation stage 32.

The RWSF is reset at the operand fetch stage 34 when the instruction I1 is shifted to the execution stage 36 However, the RWSF at the flip-flop 44E1 in the execution stage is transferred to the conflict check unit 54 by bus 60, a conflict signal is generated, and the processing of I2 halted as described above. When data is written to the first general purpose register as a result of processing I1 at the execution stage 36, the register write in is generated by the processing unit 74 and transferred to the reset port of the flip-flop 44E1 in the SE flag memory group 46E to reset the RWSF of I1. The register conflict signal is then inactivated and processing of I2 continues.

In view of the above, processing at the address computation stage 32 is halted for an instruction calling for register indirect addressing in response to the RWSF of preceding instructions being processed in preceding stages of the pipeline. Thus, in the above example, if I3 set the RWSF, this RWSF would not affect the processing of I2 because it is stored in a pipeline stage following I2. In the above example, two cycles of delay would be introduced into the pipeline as in the conventional circuit.

The second improvement dimension, denoted the horizontal dimension, refers to the existence of N flip-flops 44 in the flag group memory of each stage. When an instruction is processed at the decode stage 30 the decoder 48 generates a set of RWSFs indicating which ones of the N general purpose registers will be written to when the instruction is executed. The system for generating these RWSFs is described below with reference to FIGS. 6 and 7. This horizontal feature is especially effective for eliminating delays due to register conflicts of the second type.

For example, if I1 were to write data to the first general purpose register during T3 and T4 and I2 were to read data from the second general purpose register during T3 then no register conflict actually exists. In this embodiment, the address register designation signal indicates which general purpose register is to be read during address computation and the register conflict check unit 54 compares this designation to the locations of the RWSFs in the operand fetch and execution stages 34 and 36 to determine whether a register conflict of the second kind exists. If not, then processing of I2 is not halted at the address computation stage 34 and no delay is introduced into the pipeline.

Figure 4:
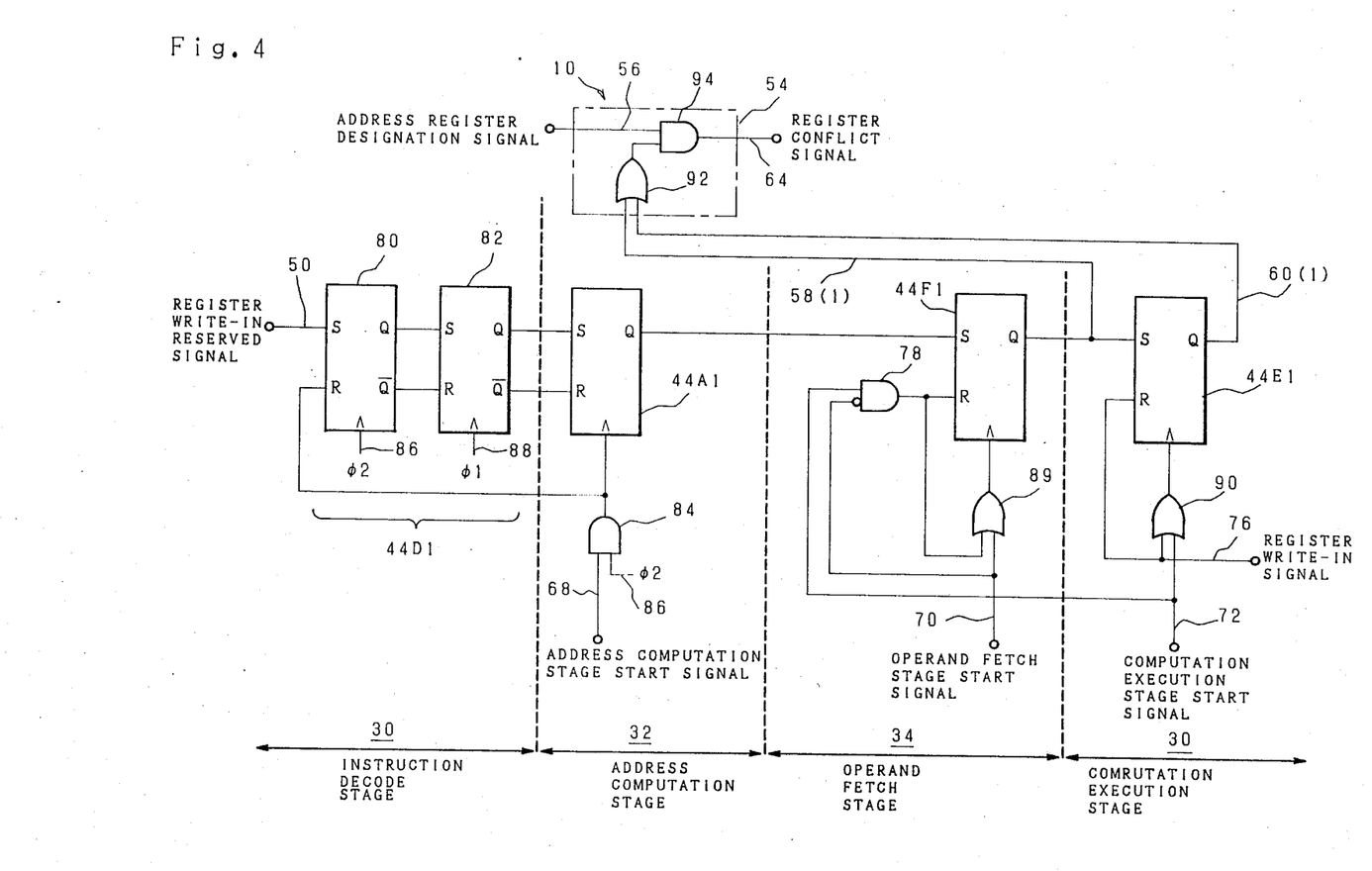
FIG. 4 is a schematic diagram of a flag group shift register.

FIG. 4 is a detailed schematic diagram of a RWSF shift register 46, conflict check unit 54, reset circuit 78, and control circuitry associated with one of the general purpose registers. Identical or corresponding parts in FIGS. 3 and 4 are given the same reference numbers. The circuitry depicted in FIG. 4 is duplicated for each general purpose register, therefore only the circuitry associated with the first general purpose register will be described in detail.

Referring now to FIG. 4, the SD flip-flop 44D1 includes two serially connected flip-flops 80 and 82. The S input of flip-flop 80 receives the RWRS on line 50(1) and the R input is coupled to the output of an AND gate 84. The inputs of AND gate 84 are coupled to the SA control line 68 and a phi2 line 86. The clock inputs of flip-flops 80 and 82 are coupled to phi1 and phi2 lines 86 and 88 respectively.

The first SA flip-flop 44A1 has its S input coupled to the output of flip-flop 82 and its R input coupled to the inverted output of flip-flop 82. The clock input of the SA flip-flop 44A1 is coupled to the output of AND gate 84.

The S input of the SF flip-flop 44F1 is coupled to the output of the SA flip-flop 44A1 the R input is coupled to the output of AND gate 78 which functions as the part of the reset circuit 78 of FIG. 3 corresponding to the first general purpose register. The clock input is coupled to the output of OR gate 88. The AND gate 78 has an inverted input coupled to the SD control line 70 and a non-inverted input coupled to the SE control line 72. The OR gate 88 has in input coupled to the output of AND gate 78 and another input coupled to the SF control line 70.

The SE flip-flop 44E1 has its S input coupled to the output of the SF flip-flop 44F1, its R input coupled to the RWRS line 76, and its clock input coupled to the output of OR gate 90. The inputs of OR gate 90 are coupled to the SE control line 72 and the RWRS line 50.

The outputs of the SF and SE flip-flops 44F1 and 44E1 are coupled to the inputs of OR gate 92 in the conflict check unit 56. The output of OR gate 92 is coupled to a first input of an AND gate 94 with the second input of AND gate 94 coupled to the address designation signal line 56(1). The output of AND gate 94 is coupled to the register conflict signal line 64.

Figure 5:
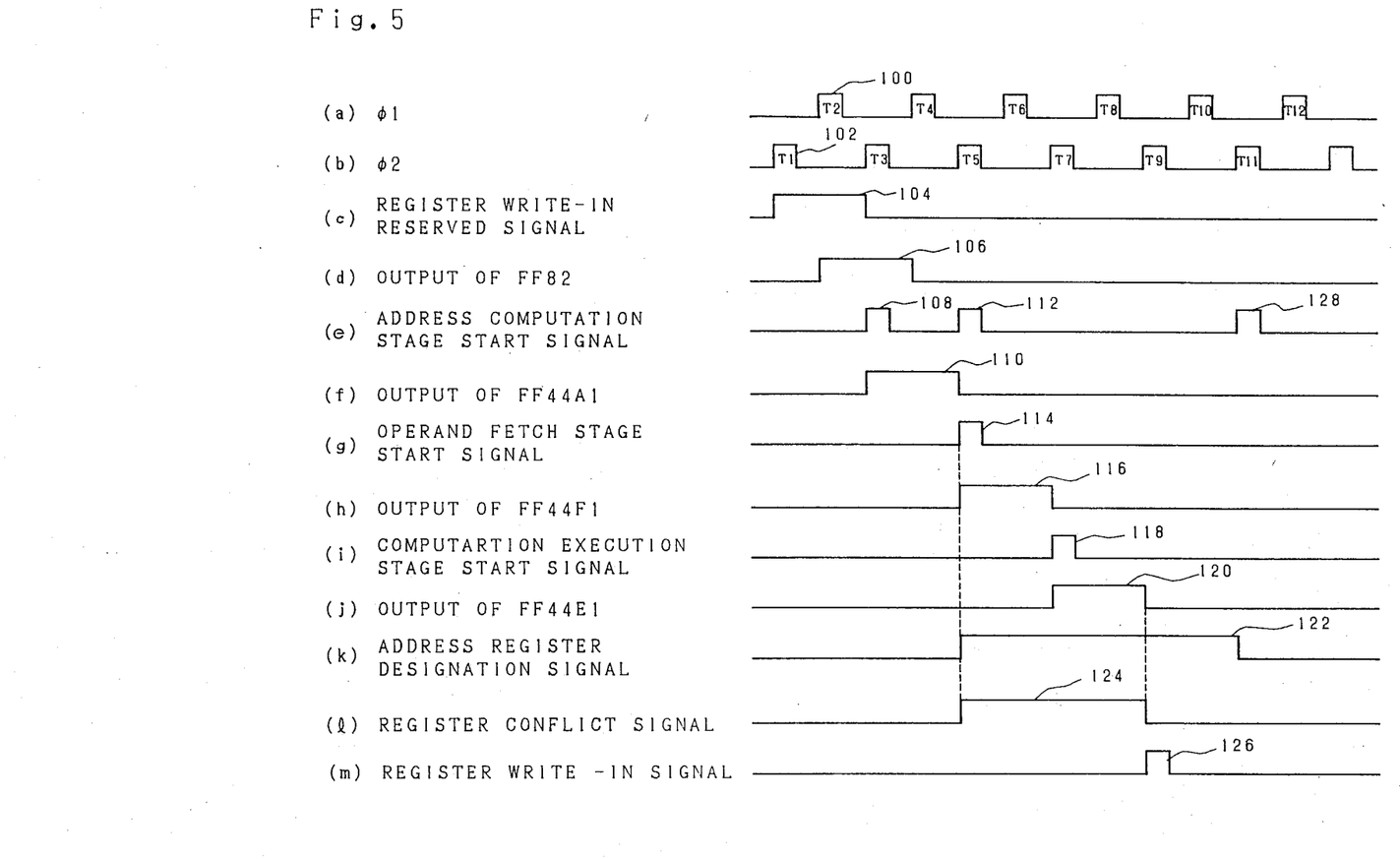
FIG. 5 is a schematic diagram illustrating the operation of the embodiments depicted in FIGS. 3 and 4.

The operation of the circuit of FIG. 4 will now be described with reference also to FIG. 3 and the timing diagram of FIG. 5. The shifting of the RWSF between the various flip-flops is the absence of register conflict will be described first. Next, the generation of the register conflict signal and associated processing will be described.

The clock signals phi1 and phi2 100 and 102 are of opposite phase and shifted to create a region where the clock signals do not overlap. A RWRS 104 is generated by I1 at T1 and sets the output of flip-flop 80. This output is shifted to flip-flop 82 at T2 and the output 106 of the flip-flop 82 functions as the RWSF when the instruction I1 is being processed in the decode stage 30.

The address computation stage start signal 108 on the SA control line 68 clocks the SA flip-flop 44A1 at phi2 to shift the RWSF from the control decode stage 30 to the address computation stage 32, causes I1 to shift to the the address computation stage 32 for processing, and resets flip-flop 80. The output 110 of the SA flip-flop 44A1 is the RWSF for I1. The flip-flop 80 is reset at T3 and the flip-flop 82 is reset at T4. Accordingly, the next instruction, I2, may set the RWSF in the decode stage 30 at T3, if necessary, and no delay is introduced into the pipeline.

At T5 a second address computation stage signal 112 and an operand fetch stage start signal 114 are generated. The SA flip-flop 44A1 is reset, the SF flip-flop 44F1 is set, and the instruction I1 is shifted to the operand fetch stage 34 for further processing. The output 116 of the SF flip-flop 44S1 is the RWSF at the operand fetch stage 34. Thus. I1 and it RWSF are shifted from the address computation stage 32 to the operand fetch stage 34 at T5. Additionally, the next instruction, I2, and RWSF are shifted from the decode stage 30 to the address computation stage 32, and a following instruction, I3, is processed at the decode stage 30.

The computation execution stage start signal 118 is generated at T7. This signal resets the SF flip-flop 44F1, sets the SE flip-flop 44E1, and shifts I1 to the execution stage 36. The output 120 of the SE flip-flop is the RWSF at the execution stage 36.

Accordingly, if no register conflicts occur, an instruction and its RWSF shift through the pipeline as described above.

As each instruction and its RWSF are shifted from the decode stage 30, the following instruction is shifted into the decode stage 30 and processed. Because the SD flip-flop 44D1 has been reset, the following instruction does not have to wait for the preceding instruction to be processed at the execution stage before setting its RWSF. Hence it is possible to multireserve, i.e., have several instructions in the pipeline reserve the same general purpose register.

The operation of the circuit for the second type of register conflict, where I1 is to write data to the first general purpose register and I2 reads data from the first general purpose register will now be described. At T5. I1 is being processed at the operand fetch stage 34 and I2 is being processed at the address computation stage 32.

Since I2 calls for register indirect addressing, the address decoder outputs an address register designation signal 122 on the first line 56(1) of the bus 56. The gates 92 and 94 form a first section 56(1) of the conflict check unit 54. This unit includes N such sections, each corresponding to a general purpose register. The address register designation signal 122 is provided to the first input of the AND gate 94. The RWSF of I1, i.e., the output of the SF flip-flop 44F1, is provided to the second input of AND gate 94 via line 58(1) and OR gate 92. Accordingly, the register conflict signal 124 is generated at T5.

The pipeline control circuit 62 receives the register conflict signal and halts processing at the decode and address computation stages 30 and 32. The pipelining control circuit halts processing at the address computation stage 32 by not generating the second address computation stage start signal 112 thereby preventing the resetting of the RWSF of I2 at the SA flip-flop 44A1.

At time T7, the computation execution stage start signal 118 resets the SF flip-flop 44F1 and sets the SE flip-flop 44E1. The register conflict signal is still active because the second input of AND gate 94 is coupled to the output of the SE flip-flop 44E1 via signal line 60(1) and OR gate 92.

At time T9, the register write-in signal is generated by the processing unit 74 and transferred to signal line 76. The RWSF of I1. i.e., the output 120 of the SE flip-flop 44E1, is reset and the register conflict signal 124 is removed because the signal at the second input of AND gate 94 is low. The pipeline control circuit generates an address computation stage start 128 signal at T11 that shifts the instruction I2 and its RWSF to the operand fetch stage 34 and inactivates the address register designation signal 122.

Figure 6:
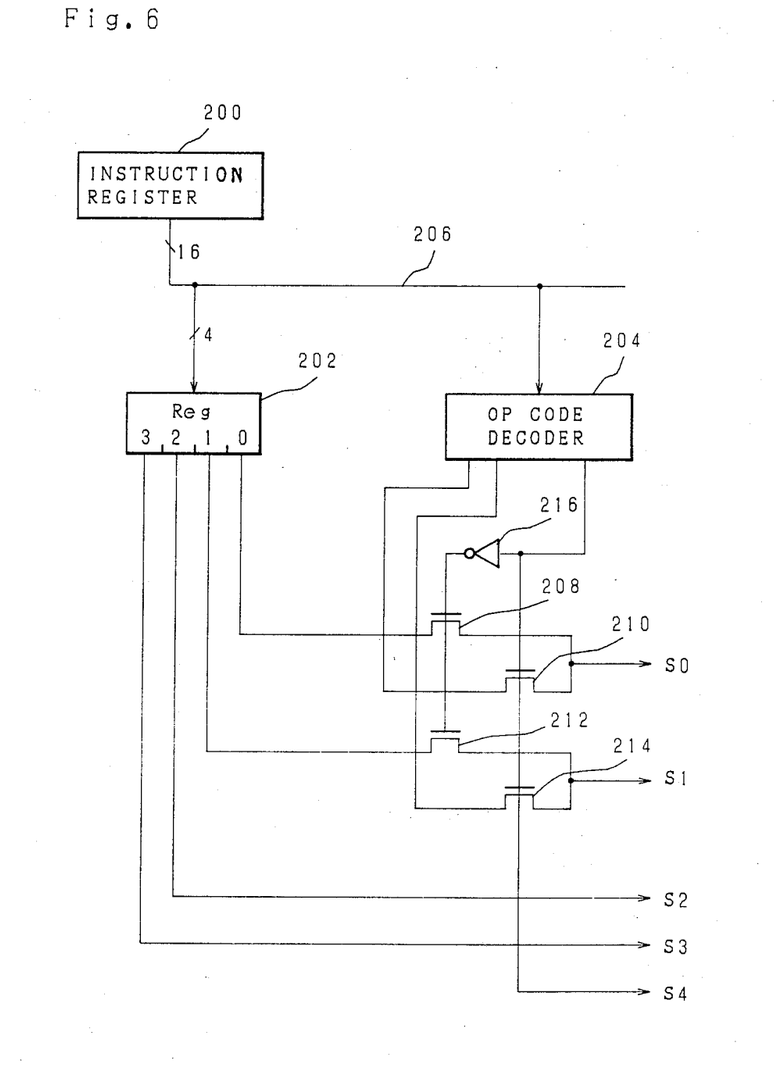
FIGS. 6 and 7 are schematic diagrams of a circuit for generating a set of flags.
Figure 7:
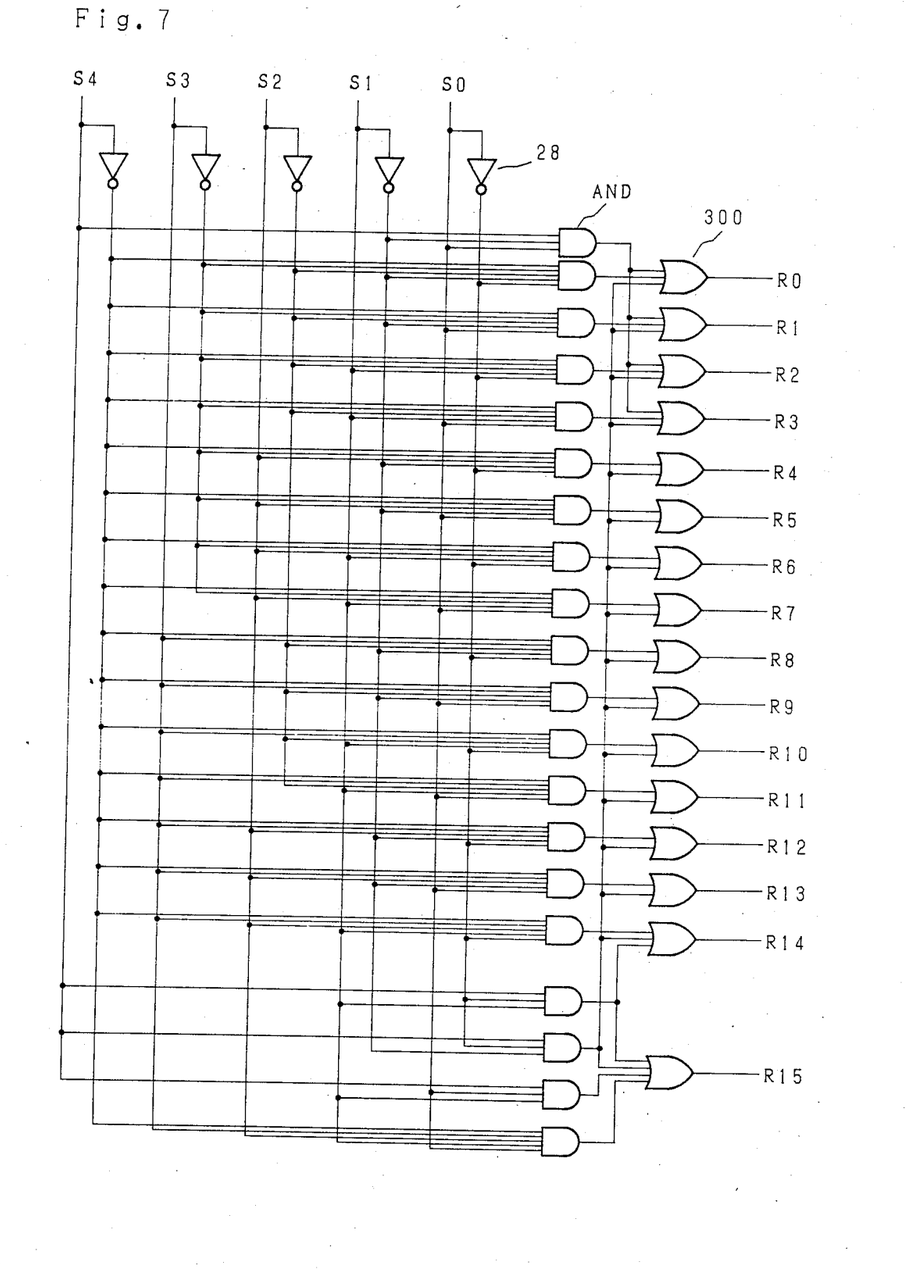

FIGS. 6 and 7 are block diagrams exemplary of one construction of a register write-in reserved signal generation circuit.

In FIG. 6, in instruction register 200 is coupled to a four bit register 202 and OPCODE decoder 204, having first, second and third outputs, by bus 206. Signal line S0 is coupled to the 0th bit in register 202 via transister 208 and to the first decoder 204 output via transister 210: signal line S1 is coupled to the 1st bit in register 202 via transister 212 and to the second decoder 204 output via transistor 214: signal lines S2 and S3 are coupled to the 2d and 3d bits; respectively, of register 202: and, signal line S4 is coupled to the third decodes 204 output and to the gates of transistors 210 and 214. The gates of transistors 208 and 212 are coupled to the third decoder 204 output via inverter 216.

When the output signal at the third output of the operation code decoder 204 is a logical "1", signals S0 and S1 fetch the output from the first and second signals outputs the operation code decoder 204. When this output signal is a logical "0", signals S0 to S3 multiplex to fetch bit 0 through bit 3 of the register 202. The output from the third output of the operation code decoder 204 is always fetched to the signal S4 and the bit 2 and bit 3 at the register 202 are always fetched to the signals S2 nd S3.

In FIG. 7, reference numeral 200 designates a PLA gate of AND-OR constitution, R0 through R15 designate sixteen write-in reserved signals, and S0 through S4 designate control signals transferred from instruction decoder shown in FIG. 6. This embodiment shows control of 16 general purpose registers of 32 bit width.

The circuit depicted in FIGS. 6 and 7 allows setting of groups of multiple RWSFs in one machine cycle to avoid delay during the decode operation.

The invention has now been described with reference to the preferred embodiments. Alternatives and substitutions will now be apparent to persons of skill in the art. In particular, although a four stage pipeline has been described, the invention is useful in pipelines having more or less than four stages. The utility of the invention increases with more stages because the delays induced in the conventional circuit would increase. Further, it is not necessary to provide flag group memories at the decode and address computation stage. The advantages of the invention would be realized if the flags were set just before processing at the operand fetch stage. Additionally, the number of circuit elements would be reduced. Accordingly, it is not intended to limit the invention except as provided by the appended claims.

What is claimed is:

1. In a data processor having a pipeline in the form of a plurality of serially connected processing stages including an instruction decode stage, an address calculation stage following the decode stage, and an instruction execution stage following the address calculation stage, with each stage for processing an instruction, where the pipeline shifts a series of instructions from stage to stage to perform pipeline processing on the series of instructions, and with the data processor including a set of N general purpose register which may be written to as a result of processing an instruction at the instruction executing stage in the pipeline or may be read from during the processing of an instruction at the address calculation stage in the pipeline, a system for managing conflicts between general purpose registers during pipeline processing comprising:

a set of N register write reserved flag (RWRF) shift registers, each RWRF shift register associated with a unique one of the genera; purpose registers and each RWRF shift register including a plurality of serially connected RWRF storage means, with each stage of the pipeline corresponding to one of the storage means in said plurality, and with the first one of said storage means in the plurality corresponding to the decode stage;

means, at the decode stage, for setting, during processing of a first instruction, the RWRF in the first storage means of only those RWRF shift registers corresponding to general purpose registers that will be written to during processing of said first instruction at the instruction execution stage;

means for shifting each RWRF to a selected following storage means in said RWRF shift register when said first instruction is being processed in the stage of said pipeline corresponding to said selected following storage means;

address decode means for setting an address register destination signal indicating the identity of a general purpose register to be read during the processing of a second instruction at the address calculation stage;

a conflict check unit, having a first input for receiving said address register destination signal and a set of inputs for receiving the RWRFs stored only in said RWRF storage elements corresponding to pipeline stages following the address calculation stage, with said conflict check unit for setting a register conflict signal only when said address register destination signal and at least one of said received RWRFs are set;

pipeline control means, having an input for receiving said register conflict signal, for halting processing at the address calculation stage and preceding stages only when said register conflict signal is set.

* * * * *